United States Patent
Tanner

(10) Patent No.: US 8,179,640 B2
(45) Date of Patent: May 15, 2012

(54) HEAD ACTUATOR VELOCITY CONTROL FOR ELECTRICAL POWER OFF IN A DISK DRIVE

(75) Inventor: Brian K. Tanner, San Jose, CA (US)

(73) Assignee: Seagate Technology International, Grand Cayman (KY)

( * ) Notice: Subject to any disclaimer, the term of this patent is extended or adjusted under 35 U.S.C. 154(b) by 635 days.

(21) Appl. No.: 12/335,759

(22) Filed: Dec. 16, 2008

(65) Prior Publication Data

US 2010/0149695 A1 Jun. 17, 2010

(51) Int. Cl.
G11B 5/55 (2006.01)
(52) U.S. Cl. .................................................. 360/264.7
(58) Field of Classification Search ................. None
See application file for complete search history.

(56) References Cited

U.S. PATENT DOCUMENTS

| 5,034,837 | A | * | 7/1991 | Schmitz .................. 360/256.2 |
| 5,729,399 | A | * | 3/1998 | Albrecht et al. ............... 360/75 |
| 6,512,650 | B1 | | 1/2003 | Tanner | |
| 6,977,794 | B1 | * | 12/2005 | Sun et al. ................. 360/78.06 |
| 7,436,616 | B2 | | 10/2008 | Hansen et al. | |
| 2002/0141101 | A1 | * | 10/2002 | Brittner et al. ................. 360/75 |

* cited by examiner

Primary Examiner — David D Davis

(57) ABSTRACT

A hard disk drive with a voice coil motor coupled to a head. The head is coupled to a disk that is rotated by a spindle motor. The spindle motor generates a back-emf current. The disk drive also includes a drive circuit that causes the voice coil motor to move the head off of the disk. The drive circuit provides at least a portion of the back-emf voltage to the voice coil motor if a head velocity exceeds a first predetermined value and a larger portion of the back-emf voltage if the head velocity exceeds a second predetermined value. For example, a relatively small amount of voltage can be provided if the head velocity falls below a first threshold to accelerate the head and a larger current can be provided if the head velocity falls below a lower threshold to generate a greater head thrust.

20 Claims, 3 Drawing Sheets

HEAD ACTUATOR VELOCITY CONTROL FOR ELECTRICAL POWER OFF IN A DISK DRIVE

BACKGROUND OF THE INVENTION

1. Field of the Invention

The present invention relates to moving a head from a disk in a hard disk drive when power to the drive has terminated.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

When a drive loses power the heads are typically moved off of the disks to prevent a loss of data. For example, the heads can be moved onto a mechanical ramp. When moving the heads off disk it is desirable to maintain a relatively slow and uniform velocity profile to prevent any sudden head movement and potential damage to the actuator suspension.

BRIEF SUMMARY OF THE INVENTION

A hard disk drive with a voice coil motor coupled to a head. The head is coupled to a disk that is rotated by a spindle motor. The spindle motor generates a back-emf voltage. The disk drive also includes a drive circuit that causes the voice coil motor to move the head off of the disk. The drive circuit provides at least a portion of the back-emf voltage to the voice coil motor if a head velocity exceeds a first predetermined value and a larger portion of the back-emf voltage if the head velocity exceeds a second predetermined value.

DETAILED DESCRIPTION

Described is a hard disk drive with a voice coil motor coupled to a head. The head is coupled to a disk that is rotated by a spindle motor. The spindle motor generates a back-emf voltage. The disk drive also includes a drive circuit that causes the voice coil motor to move the head off of the disk. The drive circuit provides at least a portion of the back-emf voltage to the voice coil motor if a head velocity exceeds a first predetermined value and a larger portion of the back-emf voltage if the head velocity exceeds a second predetermined value. For example, a relatively small amount of voltage can be provided if the head velocity falls below a first threshold to accelerate the head and a larger voltage can be provided if the head velocity falls below a lower threshold to generate a greater head thrust.

Figure 1:
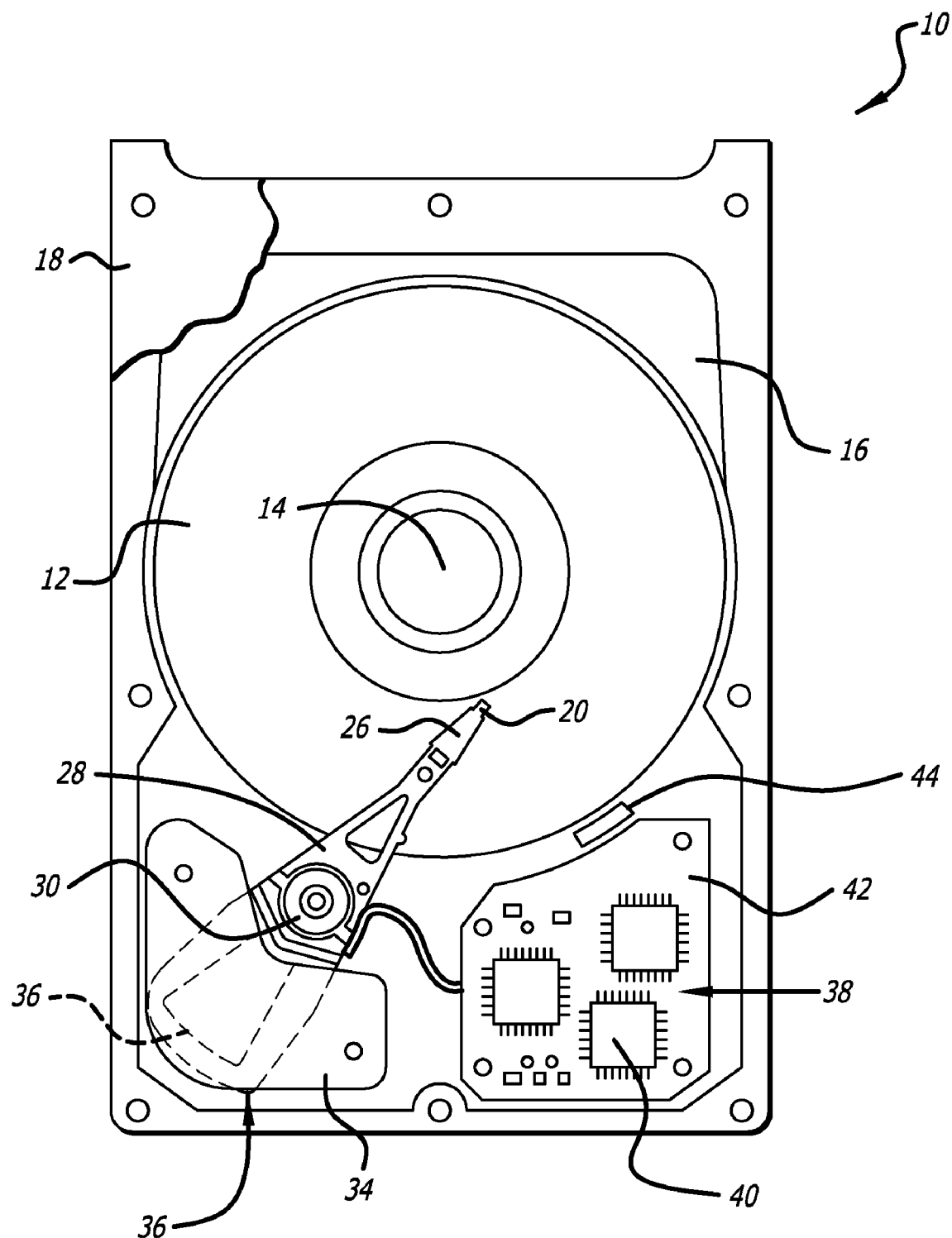
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. It is well known that the spindle motor 14 creates a back-emf voltage and corresponding current during rotation. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux.

Each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a voltage to the VCM will create a current in the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown). The drive 10 may also have a mechanical ramp 44. When the drive is not in use or when power to the drive has terminated the heads 20 can be moved onto the ramp 44.

Figure 2:
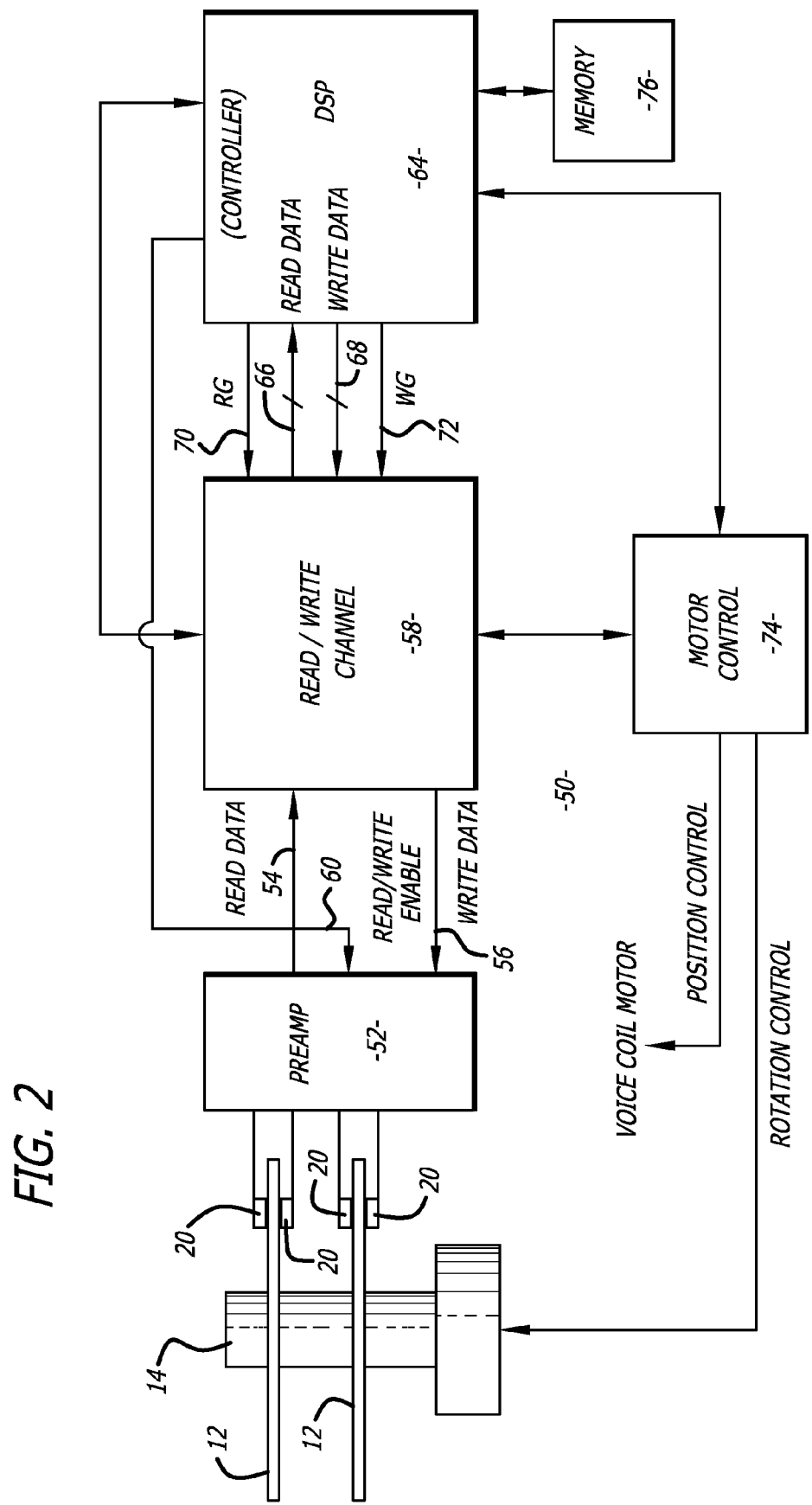
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The motor control circuit 74 provides a drive current to the voice coil motor 36 to move the heads 20 relative to the disk 12. The controller 64 may be connected to a non-volatile memory device 76. By way of example, the device 76 may be a read-only-memory ("ROM") that contains instructions that are read by the controller 64.

The motor control circuit may 74 may contain circuit that can sense the back-emf voltage of the voice coil motor and provide a voltage across the VCM to drive current through the voice coil motor. The control circuit 74 may also include rectifier circuits that can divert portions or all of the back-emf voltage generated by the spindle motor to the voice coil motor.

Figure 3:
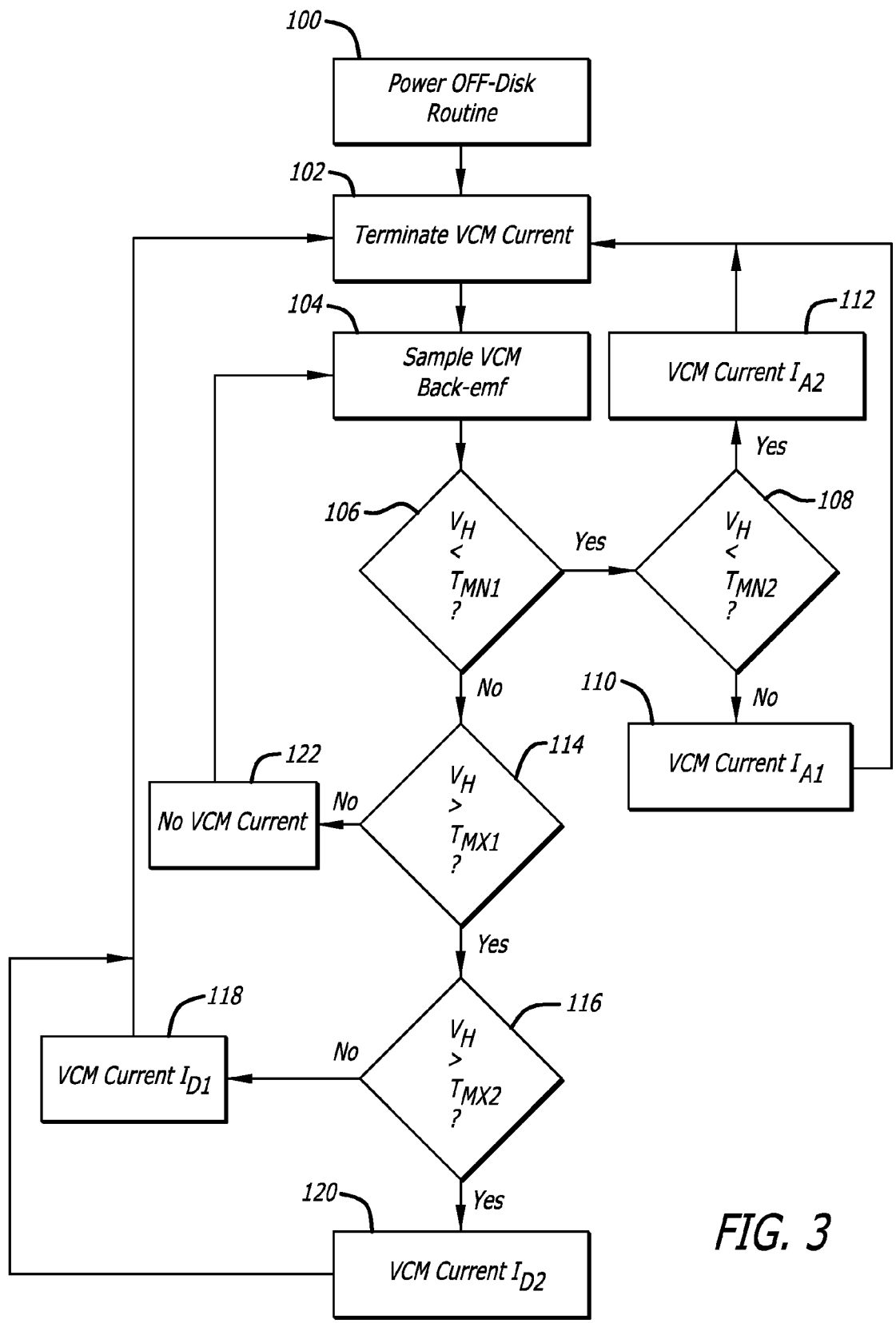
FIG. 3 is a flowchart showing a routine for moving a head off of a disk.

FIG. 3 shows a method for off loading the heads from the disk. In step 100 power to the drive has terminated and an off disk routine is initiated to move the heads off of the disks. Current to the voice coil motor is terminated in step 102. The back-emf of the voice coil motor is sampled and a head velocity $V_H$ is determined in step 104.

The head velocity $V_H$ is compared to a first minimum threshold $T_{MN1}$ in decision block 106. If the head velocity $V_H$ is less than the first minimum threshold the process proceeds to decision block 108 where the head velocity $V_H$ is compared to a second minimum threshold $T_{MN2}$. If the head velocity $V_H$ is less than the first threshold $T_{MN1}$ but greater than the second threshold $T_{MN2}$, a portion of the back-emf current of the spindle motor having a first value $I_{A1}$ is provided to the voice coil motor in block 110. If the head velocity is less than the second threshold $T_{MN2}$, then a portion of the back-emf current having a second value $I_{A2}$ is provided to the voice coil motor in block 112. The first value $I_{A1}$ may correspond to a relatively small average value that slightly accelerates the head. The second value $I_{A2}$ may be a larger average current that provides a greater head thrust.

If the head velocity $V_H$ is above the first minimum threshold $V_{MN1}$ as determined in decision block 106, the velocity is compared with a first maximum value $T_{MX1}$ in decision block 114. If the head velocity $V_H$ is greater than the first maximum threshold $T_{MX1}$, the process proceeds to decision block 116 where the head velocity $V_H$ is compared to a second maximum threshold $T_{MX2}$. If the head velocity $V_H$ is greater than the first threshold $T_{MX1}$ but less than the second threshold $T_{MX2}$ a portion of the back-emf current of the spindle motor having a first value $I_{D1}$ is provided to the voice coil motor in block 118. If the head velocity $V_H$ is greater than the second threshold $T_{MX2}$ then a portion of the back-emf current having a second value $I_{D2}$ is provided to the voice coil motor in block 120. The first value may correspond to a relatively small average value that slightly decelerates the head. The second value may be a larger average current that provides a greater head deceleration.

If the head velocity $V_H$ is greater than the first minimum threshold $T_{M1}$ and less than the first maximum threshold $T_{MX1}$ no current is provided to the voice coil motor depicted as a step 122. If a current was provided to the voice coil motor the process returns to step 102 where the current is no longer provided to the voice coil and the process is repeated. This process continues until the heads are fully off loaded from the disk, preferably when parked on the mechanical ramp.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a spindle motor for rotating said disk and for generating a back-emf voltage and a back-emf current;
   a head coupled to said disk;
   an actuator arm coupled to said head;
   a voice coil motor coupled to said actuator arm, said voice coil motor for moving said head off of said disk; and,
   a drive circuit coupled to said voice coil motor for:
      providing a portion of said back-emf current at a first acceleration value to said voice coil motor when a head velocity is between a first predetermined value and a second predetermined value, and
      providing a portion of said back-emf current at a second acceleration value to said voice coil motor when the head velocity exceeds the second predetermined value, and
      providing a portion of said back-emf current at a first deceleration value to said voice coil motor when the head velocity is between a third predetermined value and a fourth predetermined value, and
      providing a portion of said back-emf current at a second deceleration value to said voice coil motor when the head velocity exceeds the fourth predetermined value.

2. The hard disk drive of claim 1, wherein said voice coil motor is for providing at least a portion of said back-emf current at the first acceleration value to accelerate said head when said head velocity is below a first minimum value.

3. The hard disk drive of claim 2, wherein said voice coil motor is for providing at least a portion of said back-emf current at the second acceleration value to accelerate said head when said head velocity is below a second minimum value.

4. The hard disk drive of claim 1, wherein said voice coil motor is for providing at least a portion of said back-emf current at the first deceleration to decelerate said head when said head velocity is above a first maximum value.

5. The hard disk drive of claim 4, wherein said voice coil motor is for providing at least a portion of said back-emf current at the second deceleration value to decelerate said head when said head velocity is above a second maximum value.

6. The hard disk drive of claim 1, wherein said back-emf voltage is periodically sampled to determine said head velocity.

7. The hard disk drive of claim 1, further comprising a ramp that supports said head in an off-disk position.

8. The hard disk drive of claim 1, further comprising a ramp that supports said head in an off-disk position.

9. A hard disk drive, comprising:
   a disk;
   a head coupled to said disk;
   a spindle motor that rotates said disk and generates a back-emf voltage and a back emf-current;
   an actuator arm coupled to said head;
   a voice coil motor coupled to said actuator arm, said voice coil motor for moving said head off of said disk; and,
   circuit means coupled to said voice coil motor for:
      providing a first acceleration portion of said back-emf current to said voice coil motor when a head velocity is between a first predetermined value and a second predetermined value, and
      providing a second acceleration portion of said back-emf current to said voice coil motor when the head velocity exceeds the second predetermined value, and
      providing a first deceleration portion of said back-emf current to said voice coil motor when the head velocity is between a third predetermined value and a fourth predetermined value, and
      providing a second deceleration portion of said back-emf current to said voice coil motor when the head velocity exceeds the fourth predetermined value.

10. The hard disk drive of claim 9, wherein said voice coil motor is for providing at least a portion of said back-emf current at the first acceleration value to accelerate said head when said head velocity is below a first minimum value.

11. The hard disk drive of claim 10, wherein said voice coil motor is for providing at least a portion of said back-emf current at the second acceleration value to accelerate said head when said head velocity is below a second minimum value.

12. The hard disk drive of claim 9, wherein said voice coil motor is for providing at least a portion of said back-emf current at the first deceleration value to decelerate said head when said head velocity is above a first maximum value.

13. The hard disk drive of claim 12, wherein said voice coil motor is for providing at least a portion of said back-emf current at the second deceleration value to decelerate said head if said head velocity is above a second maximum value.

14. The hard disk drive of claim 9, wherein said back-emf voltage is periodically sampled to determine said head velocity.

15. A method for moving a head off a disk in a hard disk drive, comprising:
    initiating movement of a head off of a disk with a voice coil motor;
    providing a spindle motor that rotates said disk and generates a back-emf voltage and a back emf-current;
    determining a head velocity; and,
    providing a circuit for:
        providing a portion of said back-emf current at a first acceleration value to said voice coil motor when the head velocity is between a first predetermined value and a second predetermined value, and
        providing a portion of said back-emf current at a second acceleration value to said voice coil motor when the head velocity exceeds the second predetermined value, and
        providing a portion of said back-emf current at a first deceleration value to said voice coil motor when the head velocity is between a third predetermined value and a fourth predetermined value, and
        providing a portion of said back-emf current at a second deceleration value to said voice coil motor when the head velocity exceeds the fourth predetermined value.

16. The method of claim 15, wherein the voice coil motor is for providing at least a portion of said back-emf current at the first acceleration value to accelerate the head when the head velocity is below a first minimum value.

17. The method of claim 16, wherein the voice coil motor is for providing at least a portion of the back-emf current at the second acceleration value to accelerate the head when the head velocity is below a second minimum value.

18. The method of claim 15, wherein the voice coil motor is for providing at least a portion of the back-emf current at the first deceleration value to decelerate the head when said the velocity is above a first maximum value.

19. The method of claim 18, wherein the voice coil motor is for providing at least a portion of the back-emf current at the second deceleration value to decelerate the head when the head velocity is above a second maximum value.

20. The method of claim 15, further comprising sampling periodically a back-emf voltage of the voice coil motor to determine the head velocity.

* * * * *